3,549,419
CATALYTIC METHOD FOR CLEANING SOILED OVEN SURFACES
Alvin B. Stiles, Wilshire, Wilmington, Del., assignor to E. I. du Pont de Nemours and Company, Wilmington, Del., a corporation of Delaware
No Drawing. Filed Oct. 19, 1965, Ser. No. 498,125
Int. Cl. C23g 1/00; B08b 7/00; C03c 23/00
U.S. Cl. 134—2
4 Claims

ABSTRACT OF THE DISCLOSURE

The soiled surfaces of oven interiors are cleaned by applying to these surfaces a solution of at least one catalytic metal nitrate and then heating to oxidize and decompose the food residues. The solution can optionally contain a non-ionic wetting agent.

---

This invention relates to catalytic methods and compositions. It is particularly directed to a method for removing products resulting from cooking foods, especially residues of massive food spills, from the surfaces of cooking devices, by applying to the soiled surfaces a solution of at least one catalytic metal nitrate in a suitable liquid, and heating to oxidize and decompose the food products. It is also particularly directed to a method for renewing the catalytic activity of the surfaces of cooking devices which have previously been catalyst coated. The invention also concerns novel compositions of catalytic metal nitrates which are particularly adapted to practicing the methods of the invention.

The difficulties experienced in cleaning cooking devices have recently led to the development of a self-cleaning oven. This operates by heating the oven to burn out food residues. The method is not entirely satisfactory because of the high temperatures required to effect the cleaning, say 800 to 900° F.

In my co-pending application Ser. No. 359,984, now U.S. Pat. 3,266,477 there are described cooking devices having those surfaces which are exposed to products resulting from heating foods coated with catalytic materials. The catalytic surfaces permit cleaning the cooking devices at much lower temperatures by oxidation and without abrasion. Thus at moderate temperatures of say 400 to 500° F. or even lower in some cases, cooking devices can be cleaned without overheating a kitchen or work area and without other attendant difficulties of high temperatures such as distortion of equipment and requirements for large amounts of insulation.

While the cooking devices disclosed in my co-pending application alleviate many of the difficulties heretofore associated with cleaning oven interiors and the like, massive food spills and other large accumulations can be troublesome because the catalyst is effectively masked from the oxygen required for oxidation. The methods and compositions of the present invention can thus be used in conjunction with catalyst-coated cooking surfaces to effectuate thorough cleanup. They can also, of course, be used to clean previously uncoated or conventionally enamel-coated cooking surfaces by oxidation. In addition the compositions and methods of the invention can be used to renew the catalytic activity of a previously catalyst-coated surface of a cooking device such as those described in my co-pending application S.N. 359,984, now U.S. Pat. 3,266,477.

The present invention is applicable to a great variety of cooking devices. Thus, it can be applied to ovens and grills used industrially or for household purposes. In each instance the surfaces of such devices and appliances which are splattered by grease or receive drippings of grease or other massive food spills can be cleaned using the compositions of the invention. In the same way the trays and grills of broilers as well as their side walls can be treated. Trays and reflectors below burners and cooking appliances can similarly be treated. The shelves and grids of cooking devices can also be treated with catalyst compositions of the invention.

It will be understood that the invention is very broadly applicable to those surfaces of cooking devices which are subject to receiving splattered grease and other products of cooking foods and will include brick ovens, ceramic ovens, and of course the customary metal ovens in household use. This can extend similarly to cooking devices in which heating elements are embedded in ceramic walls or trays. The invention of course can be applied to such devices as rotisseries, chafing dishes, grills, and broilers of all sorts.

According to the present invention solutions of at least one catalytic metal nitrate in a suitable carrier can be brushed or sprayed onto the soiled surfaces of cooking devices of the type described. The surfaces can then be heated to temperatures of say 400 to 500° F. The nitrates are of course decomposed upon heating to the corresponding catalytically-active metal oxides, and the latter promote the oxidation and removal of the organic residues at the temperatures involved. The oxides are of course effective at higher temperatures, but it is usually not desirable to use any higher temperature than is required. Some of the catalysts, e.g., manganese oxides and the mixed oxides of manganese and chromium, are effective at even lower temperatures, say around 350° F., and these temperatures can be used but considerably longer times are required.

The nitrates contemplated for use in the compositions of this invention include the nitrates of all catalytic metals. Thus there can be used for example the nitrates of nickel, chromium, manganese, calcium, copper, cerium, cobalt, iron, zinc, magnesium, strontium, barium, and the rare earth metals. The nitrates of course can and normally will be used as the various hydrates.

The solvent is preferably water, but organic solvents or mixtures of water with organic solvents can also be used. The organic solvent should be one which boils in the range 60–200° C. and must of course be chosen with regard to its toxicity and compatability with the other components of the compositions. Odor is of course also a significant consideration, particularly where the solutions are to be used in domestic applications. Suitable organic solvents include alkanols, dialkyl ketones, alkylene glycols, halogenated alkanes, and alkyl ester of alkanoic acids boiling in the range of 60–200° C. Examples are ethanol, butanol, ethyl acetate and butyl acetate, ethylene glycol, diisopropyl ketone, and the fluorocarbons.

Concentration of the nitrate in the solvent should preferably be at or near the limit of solubility at ordinary room temperatures of about 20° C. Lower concentrations can of course also be used, but concentrations of less than about 5% by weight would not be considered economical.

If desired, there can be included in the catalytic metal nitrate solutions one or more solid finely divided catalytic materials. Thus there can be used the oxides, cerates, chromates, chromites, manganates, manganites, and vanadates of such metals as iron, cobalt, nickel, palladium, platinum, ruthenium, rhodium, manganese, chromium, copper, molybdenum, tungsten, and the rare earth metals. The term "rare earth metal" as used here and above is intended to include all the metals of the lanthanide series, i.e. lanthanum, cerium, praseodymium, neodymium, promethium, samariam, europium, galodinium, terbium, dysprosium, holmium, erbium, thullium, ytterbium, and lutetium, or their mixtures. The precious metals such as ruthenium, rhodium, palladium, and platinum, can of course also be used in elemental form. Solid compounds of the catalytic metals which decompose upon heating to provide the oxides can of course also be used. These include the hydroxides, carbonates and organic salts of the various metals. Especially desirable catalysts are the mangano-chromia-manganites disclosed and claimed in Howk and Stiles co-pending application S.N. 109,483, filed May 19, 1961, now U.S. Pat. 3,216,954.

The solid catalytic materials are prepared in ways conventional in the art so no extended discussion is necessary. In general the preparative method is to dissolve a soluble salt of the catalytic metal in water and to add a precipitant such as a soluble carbonate, hydroxide, oxalate, or algali chromate. If desired, the precipitation can be caused to take place on a catalytically active or inactive support material, as illustrated in Example 1.

After the precipitation step the catalytic material can be ground in a ball mill or similar size reduction equipment if necessary to provide particles in a suitable state of subdivision. Particle size is not highly critical but it is preferred, especially where the composition is to be applied by spraying, that the particles be substantially all of a size which will pass a 325 mesh screen. There is actually no lower limit on particle size but as a practical matter the particles will ordinarily be sufficiently large to be retained on a 600 mesh screen since smaller particles are not obtained with ordinary size reduction equipment. Of course, particles larger than −325 mesh can be used but ordinarily no advantage is gained in doing so, and the larger particles are more difficult to make adhere to the soiled and/or catalyst-coated surfaces.

If a solid catalytic material is used amounts up to about 100% based on the weight of the catalytic metal nitrate can be used. Ordinarily the amount used will be in the range of 5 to 50% based on the dissolved nitrate.

Solutions of metal nitrates when applied to a surface tend to form an adherent film which is sufficiently stable for successful practice of the method of this invention. Thus, ordinarily no film-forming agent need be added to the solutions, although this can be done, if desired, to increase the stability of the films. This is usually desirable in those instances where a finely divided solid catalytic material is included in the composition. The film-forming agents used can be the inorganic and organometallic materials commonly used for this purpose. Organic materials of course are less desirable because they may decompose under conditions of use. Certain metallo-organics such as the alkyl titanates are not preferred because of slow hydrolysis in the presence of the nitrates. Chelated titanium compounds, on the other hand, are adaptable; these are chelates of titanium with difunctional organic compounds such as hydroxy acids, amino-acids, aminoalcohols, glycols, and diketones, and are disclosed for example in U.S. Pats. 2,824,114, 2,643,262, and 2,870,181. Polymers of the alkyl titanates, e.g. polybutyl titanate, can also be used.

Also suitable as film-forming agents for use in this invention are colloidal metal oxides. Thus there can be used the colloidal fibrous boehmite alumina monohydrate described in Bugosh U.S. Pat. 2,915,475, issued Dec. 1, 1959, and colloidal silicas having a high $SiO_2:Na_2O$ ratio such as can be prepared by deionization of sodium silicates, flame hydrolysis of silicon tetrachloride, or reaction of silicon metal with water in presence of ammonia or an amine.

The additional film-forming agents, if any, should be used in amounts no greater than necessary to provide a film of the desired stability. Amounts in the range of about 3 to 45% by weight based on the total weight of the metal nitrates and other components in the solutions, excluding solvent, are satisfactory.

Maximum catalytic activity is exhibited when catalytic materials have a crystallite size of less than 200 angstroms, and preferably less than 50 angstroms. When the nitrate solutions are used in accordance with the methods of this invention, the catalytically active metal oxides are first formed upon decomposition of the nitrates as crystallites of the desired size. However, upon prolonged heating, growth of the crystallites and consequent loss of catalytic activity can occur. Accordingly, it is highly desirable to include in the solutions a material which will provide an interspersant effect, i.e. which will keep the crystallites of catalytic material apart thus preventing or inhibiting crystallite growth. In order to provide this effect, the interspersant material must have a crystallite size of the same order as the catalyst crystallites.

Interspersants can be provided by including in the solutions a heat decomposable solution salt. Most suitably there can be used a metal nitrate. The metal can be a catalytic metal such as cerium, chromium, calcium, barium, manganese, zinc, strontium, magnesium. In other words, where two different catalytic metal nitrates are included in the solution, both decompose to the oxides, and, especially where the oxides produced are of different crystal habit, each can serve as an interspersant for the other, as well as a co-catalyst. Comparatively inert metal nitrates can also be present in the solutions to provide interspersants. These include the nitrates of aluminum, thorium, titanium, and zirconium. Aluminum nitrate is particularly preferred.

Interspersants can also be introduced in the form of sols. The colloidal fibrous boehmite alumina monohydrate and colloidal silica suggested above for inclusion as film-forming agents also serve as interspersants. Other colloidal materials which can be introduced as sols to serve as interspersants include titania, zirconia, ceria, zinc oxide and hydroxide, magnesium oxide and hydroxide, strontium oxide and hydroxide. Some of these interspersants of course, also serve as co-catalysts.

Methods of producing interspersants in suitable form require no extended discussion because the preparation of colloidal dispersions of these types is well-understood.

Interspersants can be used in widely varying amounts, from say 0.5% to 50% by weight based on the total weight of solution components exclusive of solvent.

There can also be included in the compositions materials which promote oxidation by decomposing to provide molecular oxygen. Such materials can include hydrogen peroxide, metallic peroxides, e.g. barium peroxide, and ammonium nitrate. Decomposable salts such as the nitrates of aluminum and calcium not only act as sources of interspersants but also as sources of oxygen and thus as promoters. The amount of promoter can be a major proportion of the non-solvent components of the solutions, say up to 75% by weight. Ordinarily the addition is not worthwhile unless at least about 5% of the promoter is used. It should be observed that the materials such as aluminum nitrate or other residue-forming materials, should not be used in amounts so great that the ash remaining "masks" the food residue from atmospheric oxygen, or gives the oven interior or other cooking surface an unsightly appearance. Thus, ordinarily no more than about 50% by weight of such materials will be used.

It is also highly desirable to have present as a component of the solutions a minor amount of surface active agent which will cause the solution to spread evenly over the catalyst coated and/or soiled cooking surface. The surface active agents can be any of those commonly known and used as such. An extensive list of such agents appears in the publication Detergents and Emulsifiers, 1964 Annual, John W. McCutcheon, Inc., Morristown, N.J. (1964). The agents can be anionic, cationic, amphoteric, or nonionic, but the latter are greatly preferred since they leave no metallic or other residue which would adversely affect catalytic activity. Examples of nonionic wetting agents which can be used are the polyglycols, e.g. polyglycol esters such as Advawet 212 and Hodag 60 L, polyglycol alkyl ethers such as Avalon 1 L, and especially the alkylphenol ethylene oxide condensates such as Triton X–100, Acopal D, Dowfax 9N9, and Tergitol NP 27. Other nonionic wetting agents which can be used include the alkanolamine-fatty acid condensates such as Alrosol B, Emcol 5100, and Gafamido LD-579. The amount of surfactant used will ordinarily be less than 1% of the total weight of the composition, although amounts up to 3% or higher can be used. The amount should of course not be so great that foaming is enocuntered.

A further ingredient of the solutions can desirably be dispersable heat stable pigment. The choice of pigment can of course be highly significant in making a marketable commodity, especially for home use, where the cooking surfaces must have a pleasing appearance, and where the color of the solution must correspond to the color of the surface before application. Of course, the pigment chosen must be nontoxic. Suitable for use in the solutions of the invention are the mica pigments coated with translucent titania as disclosed in U.S. Pat. 3,087,828. The depth of color can, of course, be varied by increasing or decreasing the quantity of pigment used.

The invention will be further described by the following illustrative examples in which proportions of materials are by weight unless otherwise specified.

EXAMPLE 1

(1) One thousand grams of a catalyst is prepared by the method described in Example 29 of copending application of Howk & Stiles Ser. No. 109,483 now U.S. Pat. No. 3,216,954, with the exception that instead of the copper nitrate called for in Example 29 a stoichiometrically equivalent quantity of cobalt nitrate is used.

(2) One hundred grams of the catalyst prepared in Item 1 above together with 375 g. of aluminum nitrate nonahydrate, 300 g. of mixed rare earth nitrates having a composition (based on the oxides content) of: cerium dioxide 47%, lanthanum oxide 24.5%, neodymium oxide 19.5%, praseodymium oxide 6%, samarium oxide 2%, gadolinium oxide 0.5%, and yttrium and other rare earths combined 0.5% are added to a ball mill. Also to the mill is added 25 g. of "Tyzor" LA lactic acid chelate of titanium available from the Du Pont Company. Also, there is added 500 ml. of distilled water and 2 g. of "Tergitol" NP 27 produced by the Union Carbide Company and 10 g. of a heat resistant pigment of the type disclosed in U.S. Pat. No. 3,087,828.

(3) The foregoing are milled together for 18 hours to produce a thick, uniform paste of finely divided solids.

(4) A pan is placed in the oven of a domestic cook stove and the pan is charged with 45 g. of peanut oil, 25 g. of corn oil, 25 g. of commercially available cherry pie mix, 25 g. of ground beef, 25 g. of ground pork, 1 g. of sodium chloride, 1 g. of sodium glutamate, and 75 g. of water.

(5) The oven is heated and the contents of the pan spattered onto the surfaces within the oven to produce soil and drippings derived from the mixture of water, oil, and food.

(6) The oven is cooled and then the soiled walls and bottom of the oven are sprayed with a layer of the material derived from the ball milling operation in Item 3 above utilizing an aerosol sprayer.

(7) The oven is heated to 400° F. for a period of 2 hours, then the surfaces are inspected after cooling to determine the degree of removal of the soil. The areas in which moderate soil was originally present are found to be completely clean. Except for the places where inspections are made by mechanical removal, the catalyst adheres well to the walls. In those locations where there is extremely heavy soil amounting to a depth of several hundredths of an inch, it has been partially oxidized but not completely.

(8) An additional coating of the paste derived in Item 3 is placed on the most heavily soiled locations and Items 6 and 7 are repeated. After this treatment, even the most heavily soiled locations are completely clean.

EXAMPLE 2

The same procedure is followed in this example as for Example 1 except that in Item 1 a 1% platinum on alumina (8–14 mesh, 120 m.$^2$/g. surface area) catalyst is prepared by means conventional in the art. The remaining operations of Example 1 are followed utilizing the platinum on alumina catalyst derived in this example.

Instead of the platinum on alumina there can be used 2% palladium on alumina, 0.5% platinum +0.5% palladium on alumina, 0.5% platinum +0.5% rhodium on alumina or 1% platinum on silica-alumina having approximately 200 m.$^2$/g. surface area.

EXAMPLE 3

The same procedure is followed in this example as followed in Example 1 with the exception that in Item 1 the chromium content is reduced to 50 parts, the $NH_3$ is reduced to 34 parts. Ammonium carbonate is substituted for ammonia as a precipitant and added to the quantity of 392 parts to produce a slurry-suspension instead of a solution. Also in Item 2 of Example 1 there is used instead of the 375 g. of aluminum nitrate nonahydrate, 460 g. of magnesium nitrate dihydrate and instead of the 300 g. of mixed rare earth nitrates, there is used 300 g. of cerium nitrate hexahydrate. All other items of Example 1 are followed without change.

Instead of the magnesium nitrate specified in this example, there can be userd a stoichiometrically equivalent amount of barium nitrate, calcium nitrate, zinc nitrate, ammonium nitrate or strontium nitrate.

There can also be substituted for the 300 g. of cerium nitrate hexahydrate a stoichiometrically equivalent amount of a 50:50 mixture of cerium and lanthanum nitrates or cerium and neodymium nitrates.

EXAMPLE 4

Procedure is the same as that used in Example 1 except that in Item 2 there is substituted for the "Tyzor" organic titanate 100 g. of colloidal silica designated as "Cab-O-sil" and sold under this trade name by the Godfrey L. Cabot Corp.

Instead of the "Cab-O-sil" colloidal silica there can be used an equal weight, on a dry basis, of colloidal silica as "Ludox" SM, LS or that derived from elemental silicon according to either U.S. 2,614,994 or 2,614,995 (Balthis). The "Ludox" SM and LS are colloidal silicas available from the Du Pont Company.

EXAMPLE 5

The procedure is the same in this example as that employed in Example 1 except that in Item 2 instead of the 500 ml. of distilled water, there is used 200 ml. of distilled water and 300 ml. of isopropanol. Also, in the same item there is substituted for the "Tyzor" LA an equal weight of "Tyzor" TB which is the polybutyl titanate ester of titanium. In another experiment an equal weight of ethyl-orthosilicate is substituted for the "Tyzor" LA.

EXAMPLE 6

The procedure is the same as that employed in Example 1 except that in Item 2 instead of the 2 g. of "Tergitol" NP 27, there is used an equal weight of "Triton" N 100 available from the Rohm & Haas Corporation.

EXAMPLE 7

(1) Four hundred grams of mixed rare earth nitrates of the composition specified in Item 2 of Example 1 are dissolved in 500 ml. of distilled water.

(2) A pan is placed in the oven of a domestic cook stove and the pan is charged with 45 g. of peanut oil, 25 g. of corn oil, 25 g. of commercially available cherry pie mix, 25 g. of ground beef, 25 g. of ground pork, 1 g. of sodium chloride, 1 g. of sodium glutamate, and 75 g. of water.

(3) The oven is heated and the contents of the pan spattered onto the surfaces within the oven to produce soil and drippings derived from the mixture of water, oil, and food.

(4) The oven is cooled and then the soiled walls and bottom of the oven are sprayed with a layer of the catalytic metal nitrate solution of Item 1 above using an aerosol sprayer.

(5) The oven is heated to 550° F. for a period of 3 hours. At the end of this period the major proportion of the food residue has been removed. An additional coating of the solution is placed on the walls and the oven is again heated to 550° F. and held at this temperature for 2 hours. After this treatment the food residue is substantially completely oxidized and the remaining inorganic residue on the walls can be easily wiped away.

In other runs other catalytic metal nitrates or mixtures of catalytic metal nitrates are substituted for the mixed rare earth nitrates in Item 1 as follows.

| Example 8: | Grams |
|---|---|
| $Ni(NO_3)_2 \cdot 6H_2O$ | 200 |
| $Co(NO_3)_2 \cdot 6H_2O$ | 100 |
| $Mn(NO_3) \cdot 6H_2O$ | 100 |
| Example 9: | |
| $Ni(NO_3)_2 \cdot 6H_2O$ | 400 |
| Example 10: | |
| $Ce(NO_3)_3 \cdot 6H_2O$ | 400 |

Items 2–5 of Example 7 are then repeated in each run with substantially the same results.

The invention claimed is:

1. A method for removing products resulting from cooking foods from the surfaces of cooking devices of the type described which comprises applying to the soiled surfaces a solution of at least one catalytic metal nitrate in a suitable solvent and heating said soiled surfaces to a temperature sufficient to oxidize and decompose the food products.

2. A method as defined in claim 1, the catalytic metal being selected from the group consisting of nickel, chromium, manganese, calcium, copper, cerium, cobalt, iron, zinc, magnesium, strontium, barium, or a rare earth metal.

3. A method as defined in claim 2 wherein the solvent is water.

4. A method for renewing the catalytic activity of the previously catalyst-coated surfaces of cooking devices of the type described which comprises applying to the surfaces a solution of a catalytic metal nitrate in a suitable solvent.

References Cited

UNITED STATES PATENTS

| 2,472,786 | 6/1947 | Bowerman Jr. | 134—28X |
|---|---|---|---|
| 2,607,739 | 8/1952 | De Long | 134—41X |
| 3,031,408 | 4/1962 | Perlman et al. | 134—2UX |
| 3,216,954 | 11/1965 | Howk et al. | 252—440 |
| 3,266,477 | 8/1966 | Stiles | 126—273X |
| 3,271,447 | 9/1966 | Naylor | 252—472X |
| 3,367,888 | 2/1968 | Hoekstra | 252—472X |
| 2,460,700 | 2/1949 | Lyons | 252—428X |
| 2,543,708 | 2/1951 | Rice et al. | 158—96A |
| 3,068,205 | 12/1962 | Smith | 252—428X |
| 3,165,374 | 1/1965 | Hushebeck | 252—428X |
| 3,186,954 | 6/1965 | Hushebeck | 252—428 |
| 3,200,144 | 8/1965 | Baumgartner et al. | 252—438X |
| 3,271,322 | 9/1966 | Stiles | 252—428 |
| 3,384,669 | 5/1968 | MacLean et al. | 252—438X |
| 3,409,601 | 11/1968 | Borsini et al. | 252—428X |

OTHER REFERENCES

"Oven Cleaners Become More Sophisticated To Meet Demands of a Growing Market," Chemical & Engineering News, Aug. 23, 1965 (pages 47 and 48 relied on).

Fraser, O. B. J.: "Nickel as a Catalyst," 1937, published by Ware Brothers Co., Philadelphia, Pa. Paper given at the 71st meeting of the Electrochem. Society (page 27 relied on).

MORRIS O. WOLK, Primary Examiner

B. S. RICHMAN, Assistant Examiner

U.S. Cl. X.R.

23—288; 126—19; 134—4, 19, 22, 39, 40, 42; 219—393; 252—428, 438